C. E. NORTH.
DISK PLOW.
APPLICATION FILED JULY 8, 1911.

1,033,727.

Patented July 23, 1912.
2 SHEETS—SHEET 1.

WITNESSES

INVENTOR
Charles E. North,

ATTORNEYS

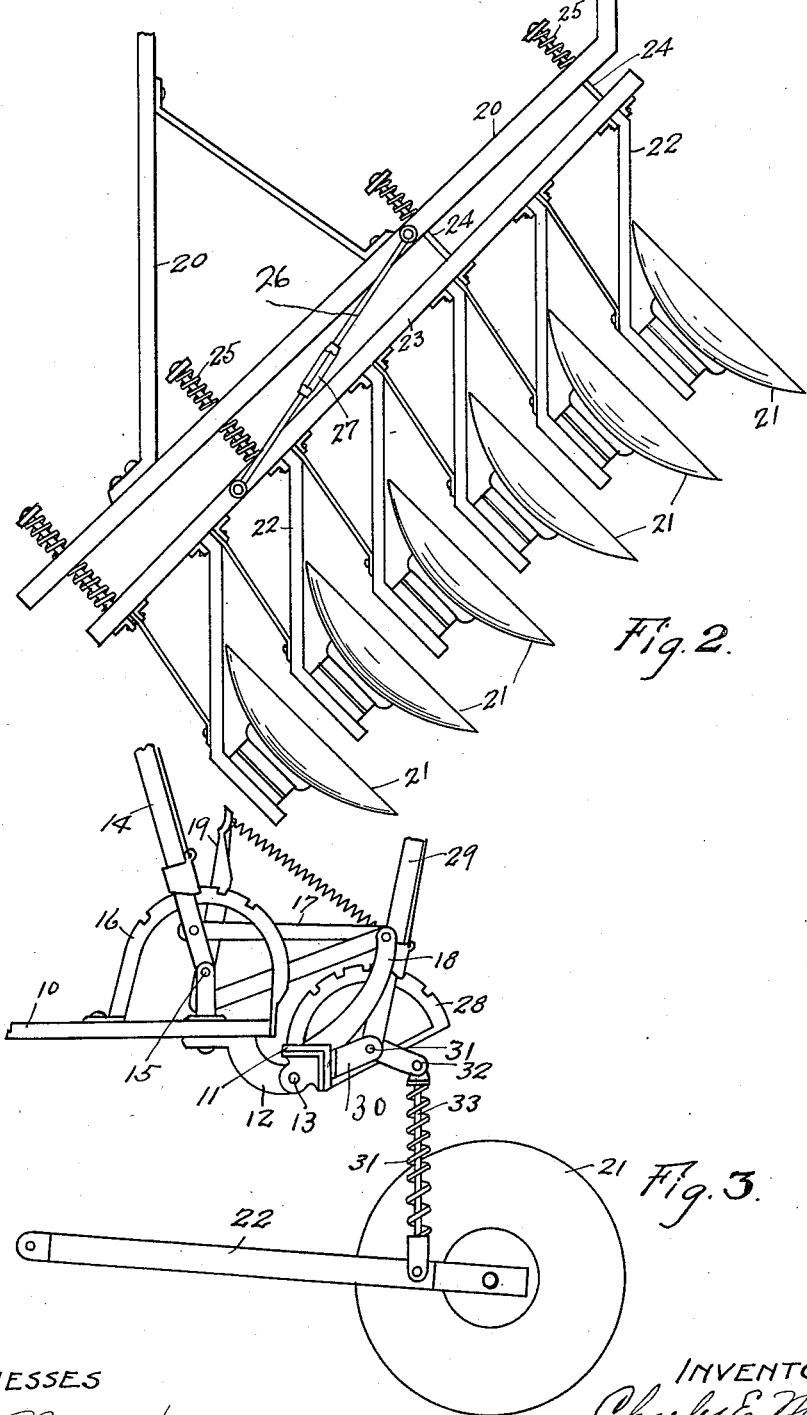

UNITED STATES PATENT OFFICE.

CHARLES E. NORTH, OF SPOKANE, WASHINGTON.

DISK PLOW.

1,033,727. Specification of Letters Patent. Patented July 23, 1912.

Application filed July 8, 1911. Serial No. 637,554.

*To all whom it may concern:*

Be it known that I, CHARLES E. NORTH, a citizen of the United States, residing at Spokane, in the county of Spokane and State of Washington, have invented certain new and useful Improvements in Disk Plows; and I do hereby declare the following to be a full, clear, and exact description of the invention, such as will enable others skilled in the art to which it appertains to make and use the same.

This invention relates to disk plows adapted for connection with tractors and has for an object to provide such an implement embodying an improved form of draft frame and disk carrying members.

A further object of the invention is to provide a frame connected with the tractor carrying auxiliary frames which may all be raised simultaneously to remove all of the disks from the ground and with independent controlling means for each of the disks separate from the master controlling means.

With these and other objects in view the invention comprises certain novel constructions, combinations and arrangement of parts as will be hereinafter more fully described and claimed.

Figure 1:
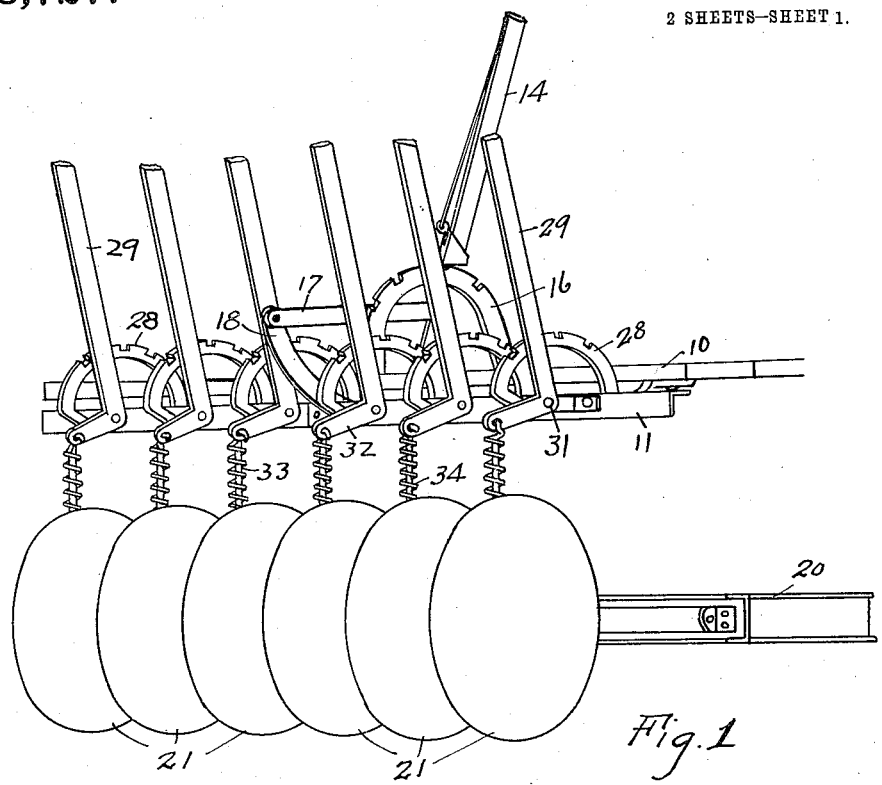
Figure 4:
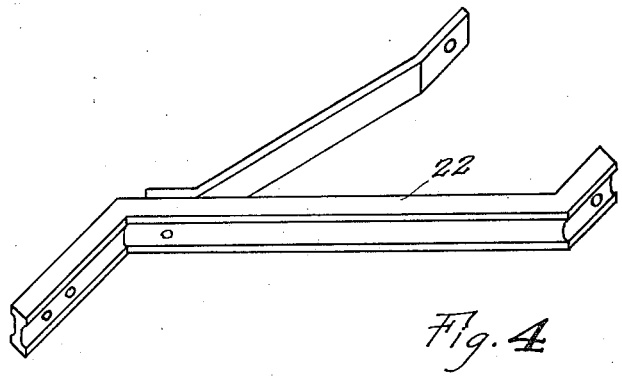

In the drawings:—Figure 1 is a perspective view of the improved disk plow apparatus. Fig. 2 is a top plan view of the disk carrying frame. Fig. 3 is a view in side elevation of a fragment of the controlling means. Fig. 4 is a perspective view of one of the disk draft frames.

Like characters of reference indicate corresponding parts throughout the several views.

The present invention comprises a frame 10 adapted to be rigidly secured to a tractor and to extend in the rear thereof at a predetermined height above the ground. At the rear of said frame a bar 11 is provided such bar being in inclined position relative to the line of travel as it is found desirable to locate the several disks on such inclined line. The bar 11 is pivoted in any approved manner as by the brackets 12 and pivots 13 and is controlled by means of a lever 14 pivoted upon such frame 10 as at 15 and engaging a segment 16 in the usual manner. The lever 14 is connected with the bar 11 by means of a link 17 and arm 18, the latter being rigidly connected with the bar 11 while the link 17 is pivoted at one end to the lever 14 and at its opposite end to the arm 18. To assist in operating the lever 14 a foot lever 19 is also provided.

Under the frame 10 a second frame 20 is connected with the tractor. The frame 20 serves as the draft for the disks 21 which are connected with such frame through the medium of individual auxiliary frames 22 and a draw bar 23 to which such auxiliary frames 22 are pivoted. The draw bar is preferably resiliently connected with the frame 20 by means of bolts 24 and springs 25 and also by means of an inclined bar 26 having a turn buckle 27 thereon.

Upon the bar 11 is a plurality of segments 28 such segments corresponding in number to the disks 21. A similar number of levers 29 are also pivoted upon the bar 11 in any improved manner as by means of the brackets 30 and the pivot pin 31. The levers 29 are of a bell crank formation, the opposite leg 32 being connected each directly with one of the frames 22 by means of the rod 33 and spring 34. It will be apparent from this arrangement that either of the disks 21 may be independently adjusted by manipulating one of the levers 29 and that the said disks will be held in the ground by the tension of the springs 34.

All of the disks, it will be apparent, may be lifted from the ground by manipulating the lever 14 assisted by the foot lever 19 which will rotate the bar 11 upon its pivot 13 to raise all of such disks and their auxiliary frames simultaneously. The particular advantage of the arrangement of the disks in this manner so that all may be so lifted is that in turning, undue binding may be avoided, also the tractor may back into corners and up to fences and the like and thus save the usual waste of land which is not cultivated. The advantage of the independent adjustability is that in working in uneven soil the disks may be independently adjusted to cut similar depths in the soil irrespective of the surface elevation.

While the device has been illustrated and described as employed with disk plows it will be apparent that it is not necessarily limited to plows of the disk variety but is capable of comprehending plows of any other variety as the mold-board construction.

I claim:—

1. The combination with two frames adapted to be attached to a tractor one above the other, of a bar pivoted upon the upper frame, a lever carried by the upper frame adapted to move the bar rotarily, a plurality of auxiliary frames pivotally connected with the lower frame, earth cultivating means carried by the auxiliary frames, levers mounted upon the bar equaling in number the auxiliary frames, and means connecting the levers with such auxiliary frames.

2. The combination with two frames adapted to be attached to a tractor one above the other with their rearward sides inclined to the path of travel of a bar pivoted along the inclined side of the upper frame, a lever carried by the upper frame adapted to rotate the bar, a plurality of segments mounted upon the bar, levers pivoted upon the bar corresponding in number to the segments, auxiliary frames pivotally secured to the inclined side of the lower frame equaling in number the segments on the bar, earth cultivating means carried by the auxiliary frames, and links connecting the plurality of levers with the auxiliary frame.

3. The combination with a frame adapted to be attached to a tractor, of a second frame likewise adapted to be attached to a tractor below the first mentioned frame and both of said frames having a rearward side inclined to the line of travel, a rail carried by the lower frame spaced from the inclined side, yielding means connecting the rail with the inclined side of the lower frame, earth cultivating means individually pivoted to the rail, means carried by the upper frame for adjusting the auxiliary frames individually, and means carried by the upper frame for adjusting all of said earth cultivating means simultaneously.

In testimony whereof I affix my signature in presence of two witnesses.

CHARLES E. NORTH.

Witnesses:
 WARREN W. TOLMAN,
 JOHN KING.

---

Copies of this patent may be obtained for five cents each, by addressing the "Commissioner of Patents, Washington, D. C."